(12) United States Patent
Tomkins

(10) Patent No.: US 8,140,996 B2
(45) Date of Patent: Mar. 20, 2012

(54) SYSTEM FOR ENDLESS LOOP SCROLLING AND DISPLAY

(75) Inventor: Steven Tomkins, Ottawa (CA)

(73) Assignee: QNX Software Systems Limtied, Ottawa (CA)

( * ) Notice: Subject to any disclaimer, the term of this patent is extended or adjusted under 35 U.S.C. 154(b) by 1000 days.

(21) Appl. No.: 12/058,541

(22) Filed: Mar. 28, 2008

(65) Prior Publication Data

US 2008/0263452 A1   Oct. 23, 2008

Related U.S. Application Data

(60) Provisional application No. 60/912,423, filed on Apr. 17, 2007.

(51) Int. Cl.
*G06F 3/048* (2006.01)
(52) U.S. Cl. ............ 715/785; 715/834; 715/730
(58) Field of Classification Search ............... 715/785, 715/834
See application file for complete search history.

(56) References Cited

U.S. PATENT DOCUMENTS

| | | | | |
|---|---|---|---|---|
| 7,246,329 B1 * | 7/2007 | Miura et al. | ................. | 715/810 |
| 2004/0155907 A1 * | 8/2004 | Yamaguchi et al. | .......... | 345/810 |
| 2004/0250217 A1 * | 12/2004 | Tojo et al. | .................... | 715/810 |
| 2007/0164989 A1 * | 7/2007 | Rochford et al. | ............. | 345/156 |
| 2008/0288880 A1 * | 11/2008 | Reponen et al. | ............. | 715/764 |

* cited by examiner

*Primary Examiner* — Chat Do
*Assistant Examiner* — Andrea C Leggett
(74) *Attorney, Agent, or Firm* — Brinks Hofer Gilson & Lione

(57) ABSTRACT

A system includes a display that is controlled by a processor. Software code may be executed by the processor to link a plurality of images of an image set into an endless loop in virtual space. The images of the image set may be scrolled along the endless loop for display. The endless loop may include one or more portions to which the images of the image set that are not currently visible on the display are linked, and one or more further portions to which the images of the image set that are currently visible on the display are linked.

32 Claims, 6 Drawing Sheets

SYSTEM FOR ENDLESS LOOP SCROLLING AND DISPLAY

CROSS-REFERENCE TO RELATED APPLICATIONS

The present application claims the benefit of priority to U.S. Provisional Application Ser. No. 60/912,423, filed Apr. 17, 2007 which is hereby incorporated by reference.

BACKGROUND OF THE INVENTION

1. Technical Field

The application relates to graphic user interfaces, and in particular, to a system that scrolls through objects.

2. Related Art

Computer and electronic devices may have graphical user interfaces that allow a user to navigate through various images. A collection of images may be displayed for selection using an array of thumbnail images. If a five-by-five array of thumbnails is displayed, a user may selection from twenty-five images. Arrays of thumbnail images may use a substantial amount of display area and be difficult for a user to select a desired image.

Images may also be selected from a sequential list of image names. A user may cycle through the list and select an image for display. Such methods may require the user to remember the image name. If thumbnails corresponding to the image names are provided, the amounts of display area used for the list may be substantial.

SUMMARY

A system includes a display that is controlled by a processor. Software code may be executed by the processor to link a plurality of images of an image set into an endless loop in virtual space. The images of the image set may be scrolled along the endless loop for display. The endless loop may include one or more portions to which the images of the image set that are not currently visible on the display are linked, and one or more further portions to which the images of the image set that are currently visible on the display are linked.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
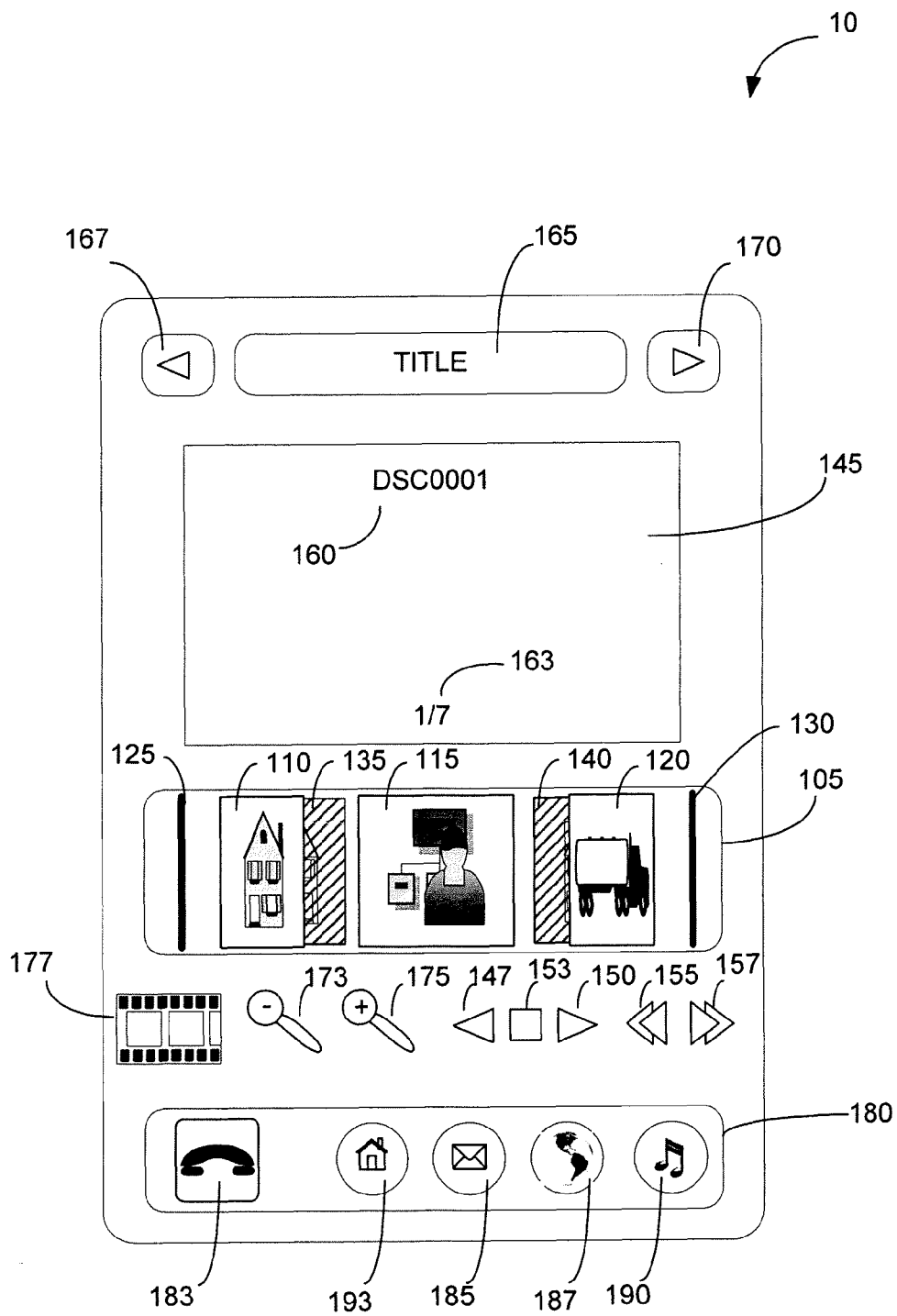
FIG. 1 is a graphic user interface.

FIG. 1 is graphic user interface 100. The graphic user interface 100 includes a thumbnail display area 105 in which a miniature version of an image or page may be displayed. Thumbnail images 110 through 143, including images 110, 115, 120, 125, 130, 135, 140, and 143 (image 143 not show in FIG. 1), are shown below a main viewing area 145 in which larger versions of selected images are shown. In some systems, the thumbnail images 110 through 143 may be viewed or accessed through the thumbnail display area 105 in real time or near real time. Various controls may be actuated by a user. Software, a processor, or controller may respond to actuation of the controls to modify the rate and pattern with which the thumbnail images 110 through 143 are viewed. In FIG. 1, the thumbnail images 110 through 143 may scroll through the thumbnail display area 105 in one or more directions (e.g., a left to right direction or a right to left direction). Other scrolling patterns may also be used.

The images in the thumbnail display area 105 may rotate through an end-less curvilinear shape in virtual space. The virtual space may be managed by software, a processor, and/or a controller. One such virtual shape comprises a curvilinear shapes such as a figure-eight loop.

In FIG. 1, activation of left arrow 147 may cause the thumbnail view of the images 110 through 143 to scroll through the thumbnail display area 105 in a right to left direction. Each subsequent activation of the left arrow 147 may cause an incremental increase in the rate at which the scrolling to the left occurs. Activation of the right arrow 150 may cause the thumbnail images 110 through 143 to scroll to the right. Each successive activation of the right arrow 150 may cause an incremental increase in the rate at which the scrolling to the right occurs. Alternatively, the controls may operate in the reverse fashion, where activation of the left arrow 147 results in rotation of the thumbnail images 110 through 143 to the left and where activation of the right arrow 150 results in rotation of the thumbnail images 110 through 143 to the right.

If the thumbnail images 110 through 143 are scrolling to the left when the right arrow 150 is activated, the rate at which the scrolling occurs may be reduced. Activation of the left arrow 147 when the thumbnails of images 110 through 143 are scrolling toward the right may reduce the rate of at which the thumbnail images 110 through 143 are scrolling to the right.

Activation of the stop button 153 may cause the scrolling of the thumbnail images 110 through 143 to stop. When scrolling stops, the next image in the current direction may be substantially centered in the thumbnail display area 105. This centering may occur regardless of the current scrolling rate.

Activation of the double left arrows 155 may cause the thumbnail images 110 through 143 to scroll left to the next image before stopping. Activation of the double right arrows 157 may cause the thumbnail images 110 through 143 to scroll right to the next image before stopping.

The rate at which the thumbnail images 110 through 143 scroll through the thumbnail display area 105 may be controlled by a "gesture" through a game mechanical or a wireless relative or absolute pointing device. A relative pointing device is a cursor-control device in which movement of an on-screen cursor is linked to movement of the device, but not to the position of the device. An absolute pointing device is a pointing device whose location is associated with the position of the on-screen cursor. The device may include a mouse, a wireless controller, finger, stylus, or other absolute or virtual pointing device. Generating a gesture over the thumbnail display area 105 in a left to right direction may cause the thumbnail images 110 through 143 to scroll in the direction of the drag (e.g., to the right). The further the gesture ends from its starting point, the faster the thumbnail images 110 through 143 scroll across display area 105. Generating a gesture in a right to left direction may cause the thumbnail images 110 through 143 to scroll to the left. The further the gesture ends from its starting point, the faster the thumbnail images 110 through 143 scroll across display area 105.

Activation of an image in the thumbnail display area 105 may cause display of a larger version of that image in the main viewing area 145. The image may include the file name, title, file metadata, or other identifier 160, and/or the number of image in an image set 163. The identifier 160 may be searchable to find an image. The "1/7" text shown at 163 of FIG. 1 indicates that the currently displayed image is the first of seven images in this particular set. The name of the set of images (or the folder, directory or similar identifier) may be displayed in a text block 165. Navigation to the next or previous set of stored images may occur through activation of the left arrow 167 or right arrow 170.

Activation of the "+" magnifying glass icon 175 may cause enlargement of the image in the main viewing area 145, while activation of the "−" magnifying glass icon 173 may cause reduction in the size of the image in the main viewing area 145. Activation of the slideshow icon 177 may initiate a full-screen slide show of the images in the current set.

Graphic user interface 100 may also include a set of icons 180 for launching applications. The icons may include a telephone application icon 183, email application icon 185, Internet browser icon 187, and music/video player icon 190. A "home" icon 193 may be used to return to a home page and/or initial state.

Figure 2:
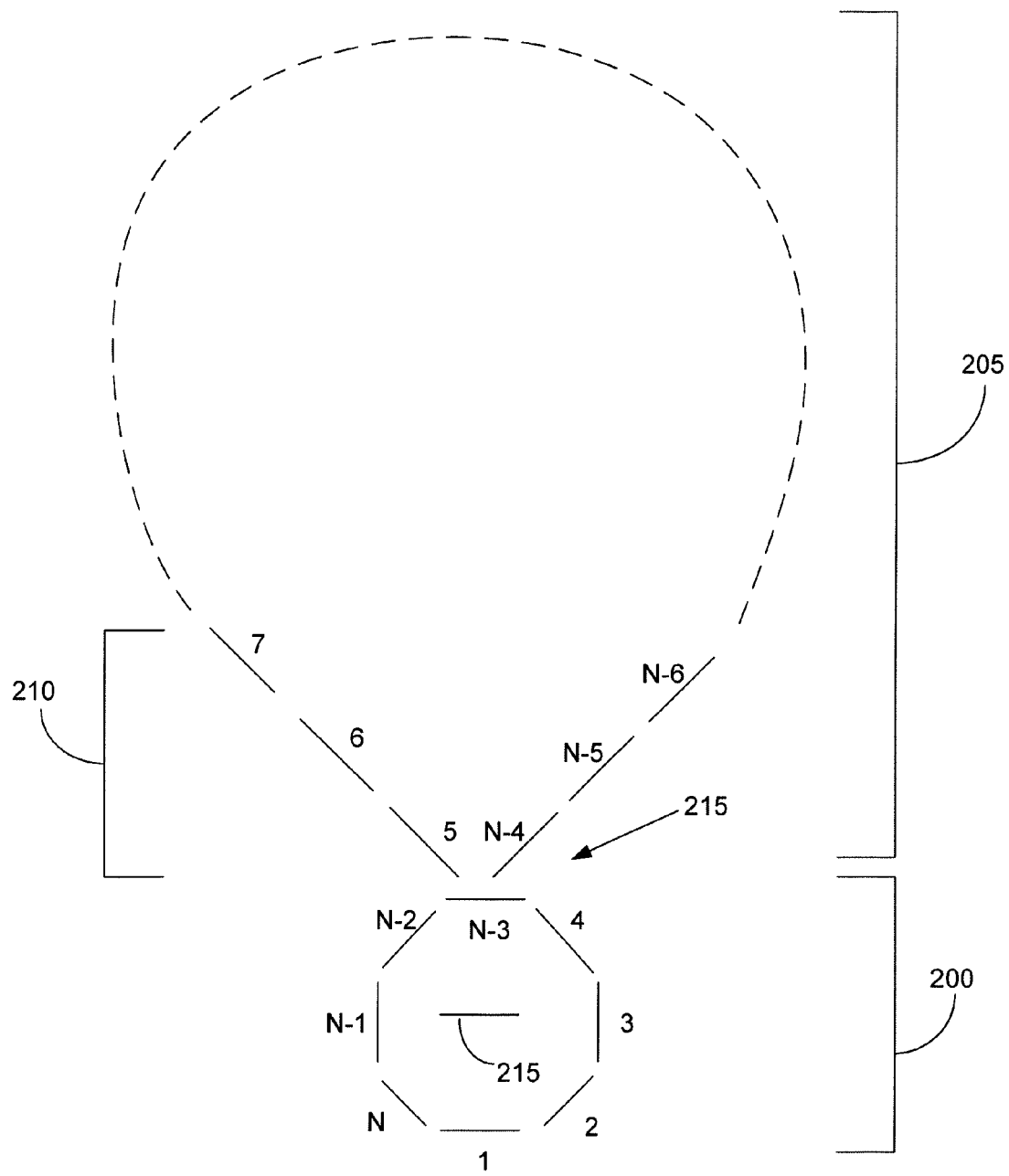
FIG. 2 is a virtual organization of images managed by graphic user interface code.
Figure 3:
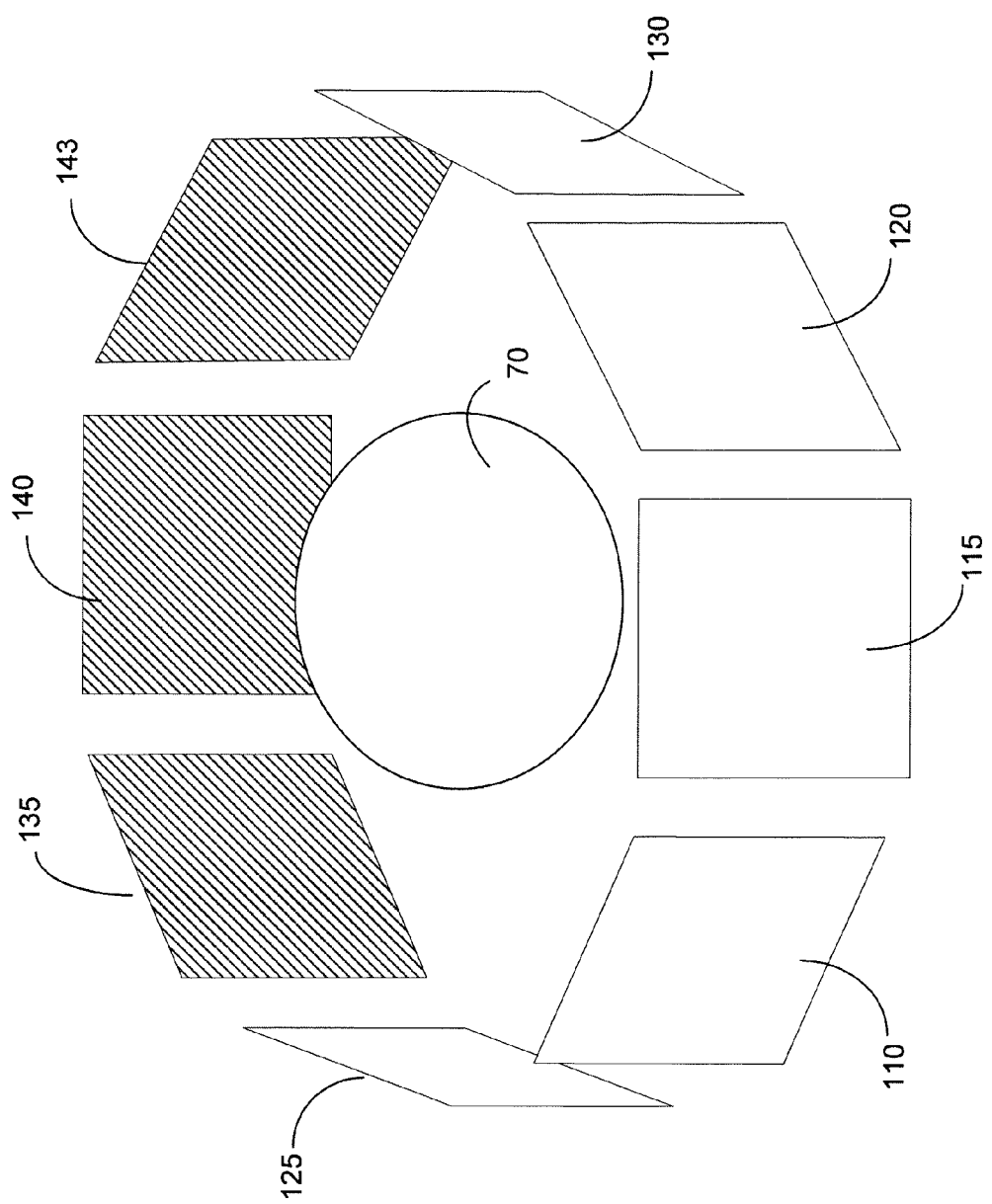
FIG. 3 is a virtual perspective view of the images displayed by the graphic user interface code.

In FIG. 2, the images in a given set (N images in this exemplary case), are organized in virtual space in an endless loop configuration. Here, the shape of the endless loop configuration is in the form of a figure-eight. The figure-eight may have two lobes. A first lobe 200 may include images that appear in the thumbnail display area 105. A second lobe 205 may include images that do not currently appear in the thumbnail display area 105. As the thumbnail images 110 through 143 scroll through the thumbnail display area 105, they may stay in sequence (1, 2, 3, . . . N−2, N−1, N), moving into and out of regions 200 and 205. The path circumscribing the two regions in the figure-eight like space is endless, and may include a crossover point.

A predetermined number of images in virtual region 210 may be cached in a remote or local memory storage. Local memory may include volatile memory, hard disk memory, optical memory, or other memory resident in system 100. Remote memory storage may include network memory, wirelessly accessible memory, Internet storage, or other memory remote from system 100. In some systems, all of the images in region 205 may be cached.

In FIGS. 2 through 5, the thumbnail images 110 through 143 may be arranged in virtual region 200 so that their vertical center points are evenly or almost evenly spaced about a circle 70 of the virtual region 200. This layout provide the perception that the thumbnail images 110 through 143 are arranged in a substantially octagonal shape, or other polygon depending on the number of images in the thumbnail display area 105. An icon, logo, or other image 215 may also be included in virtual region 200 to serve as a background image/wallpaper for thumbnail display area 105.

Figure 5:
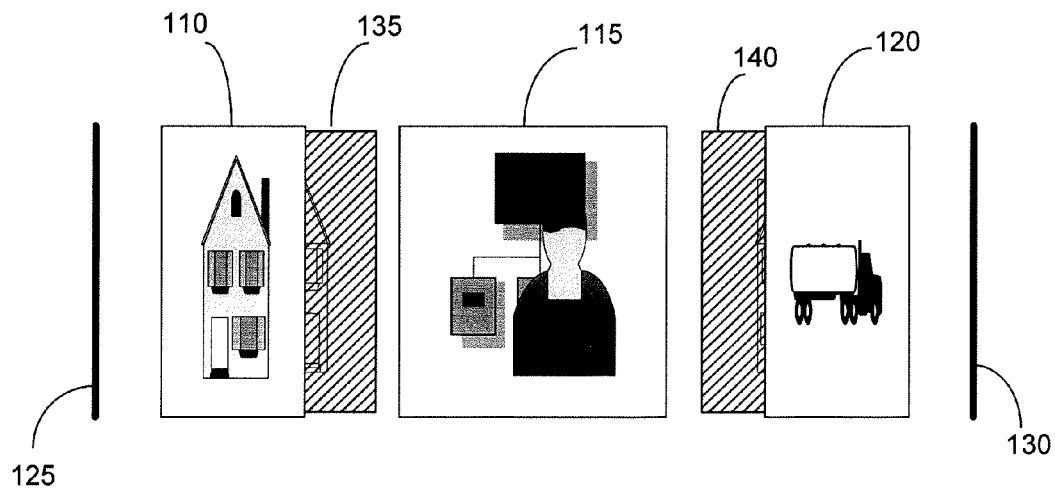
FIG. 5 is a second view of the images displayed using the graphic user interface code.

A number of properties of the thumbnail images 110 through 143 may be modified as the images scroll through the thumbnail display area 105. These properties may include:

1. Scaling of the images along the x-axis as they "rotate" from the front of the thumbnail display area 105, to either side, so that ultimately only the side edges of these images are viewable as they reach an angle of about 90° or about 270° from the normal viewpoint of the display of about 0° (see FIG. 4);

2. Scaling of the images along the y-axis (e.g., by about 5%) as an images rotated from the front of the thumbnail display area 105 to the rear, the front of the display area 105 being at about 0° and the rear of the display area 105 being at about 180°. Y-axis scaling may be seen in the thumbnail images 110 through 143 shown in FIG. 5. This y-axis scaling provides an impression of depth, which lends itself to a 3-D appearance of the interface;

3. As shown in FIG. 5, images 135, 140, and 143, (image 143 is not shown in FIG. 5) may be viewed through gaps between the foreground images 110, 115, and 120. The foreground images 110, 115, and 120 may be translucent or transparent; and 4. As shown in FIG. 5, the background images 135, 140, and 143 may be mirror images of the main thumbnail and alpha blended to appear darker. This adds to the perception that the images are rotated in a circle in that these images appear to be translucent and viewed from behind. Images that are further in the background may be displayed darker than those closer to the foreground.

The graphic images, may include a variety of image types, including:

1. An icon corresponding to a software application, where activation of the icon may launch the corresponding software application;

2. The artwork for a musical album and/or song, where actuation of the icon may cause playback of the corresponding music files and/or display a list of the songs on the represented album; or 3. An icon corresponding to a static image from a video. Activation of the icon may launch a video player application that plays the video corresponding to the static image.

The system 100 may be implemented on a microprocessor or microcontroller platform including a personal computer, a telematic device, a wireless telephone, a personal digital assistant (PDA), a personal audio and/or video player (such as an iPod or MP3 player), or other intelligent device having a display.

The system may be implemented using any of a variety of software/operating system platforms or environments. Such software/operating system platforms may include a Flash/Actionscript environment. Another programming language such as C, C++ or an object-based language may be used. If C/C++ code is used, the images may be organized into arrays, a linked list, or some other programming structure. If the system is implemented in a Flash environment, the images may be implemented as movie clips. In such instances, each image may be a separate movie clip.

Figure 6:
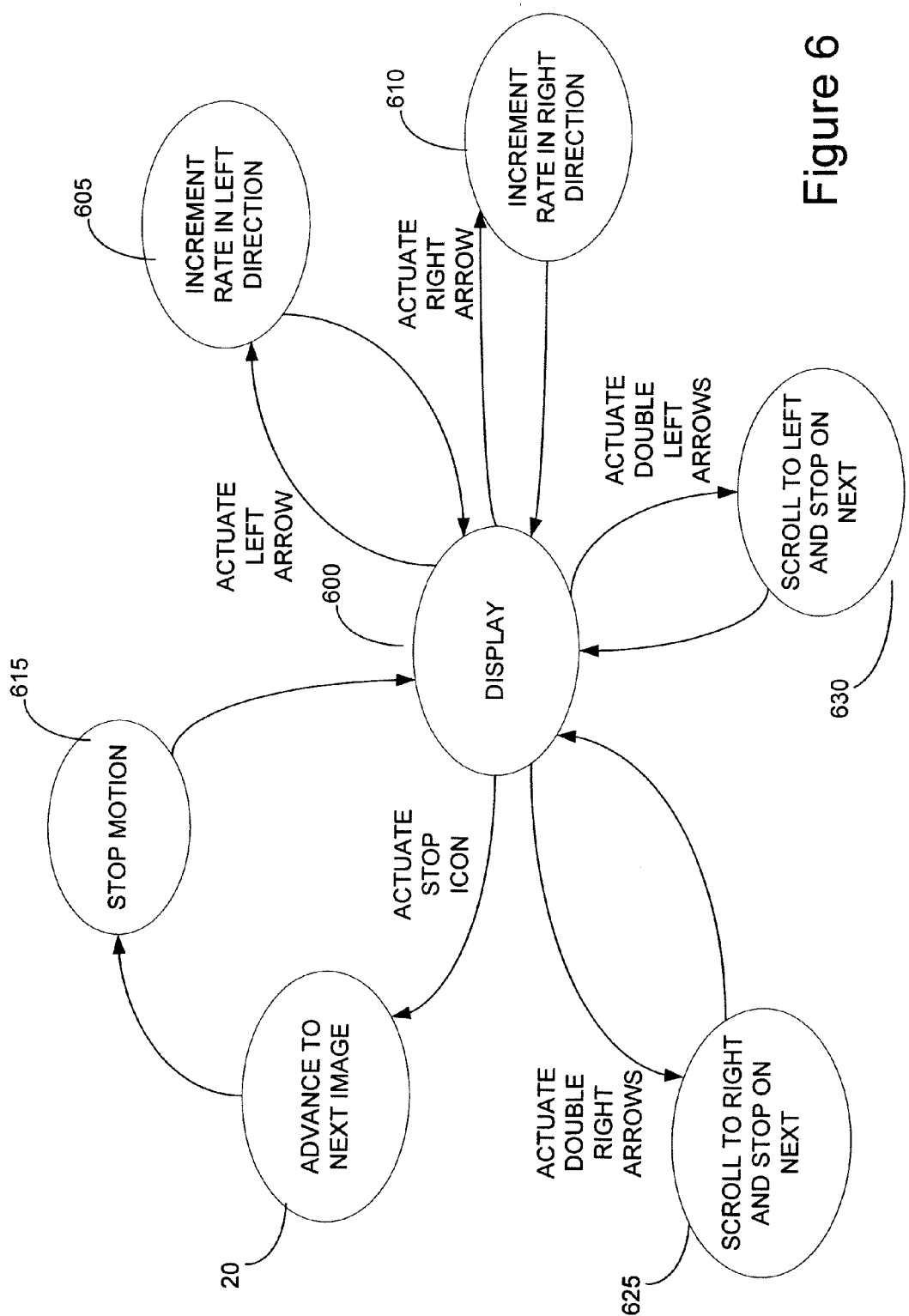
FIG. 6 is a state diagram of control functions.
Figure 7:
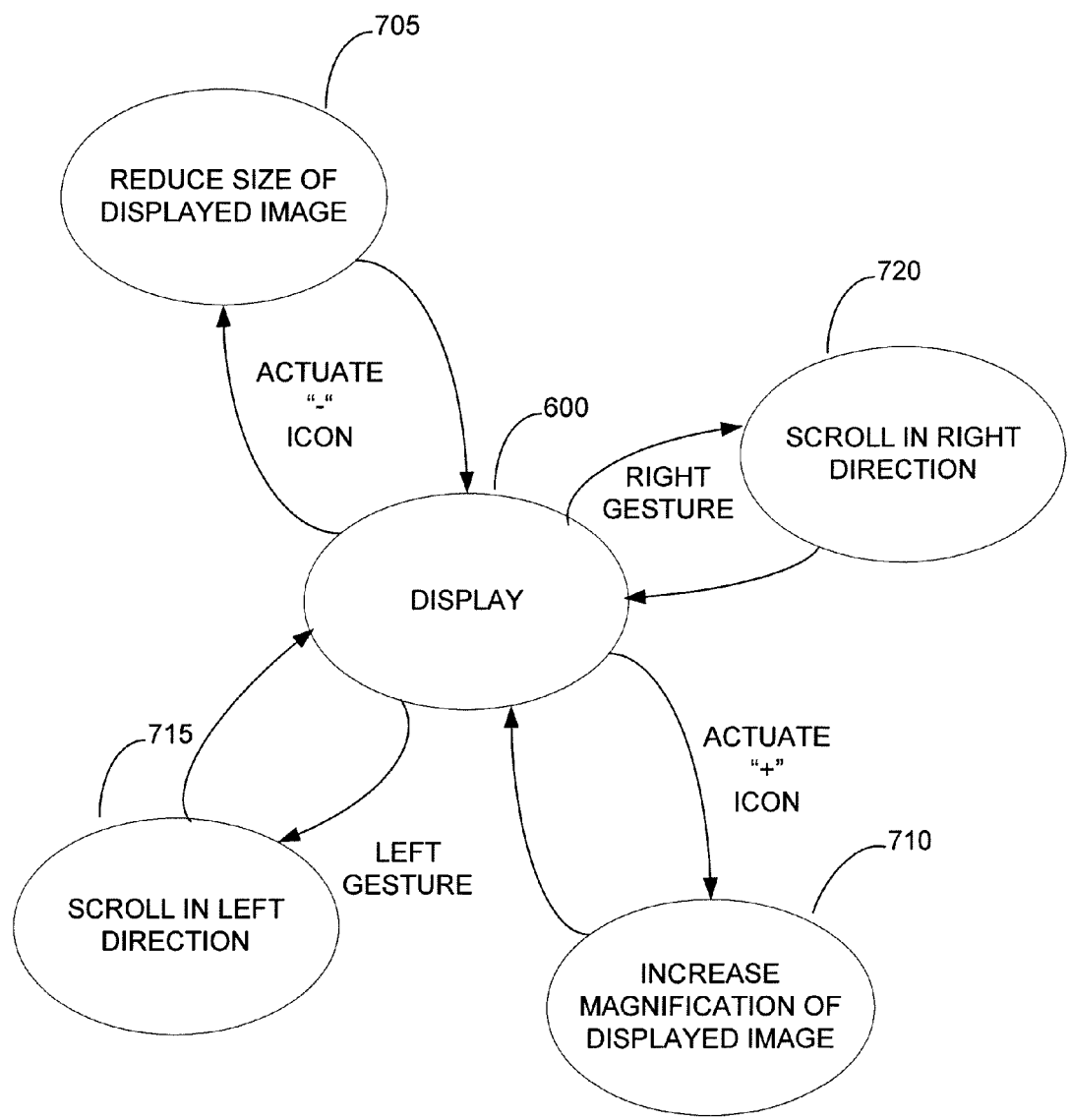
FIG. 7 is a state diagram of further control functions.

FIGS. 6 and 7 are state diagrams that describe control functions. The "home" state may be the display state 600 of FIG. 6, where:

1. The bulk of the graphic user interface 100 is provided as a static display;

2. Images 110 through 143 may be cycled through the thumbnail display area 105; and 3. The system monitors the activation of user interface controls.

Figure 4:
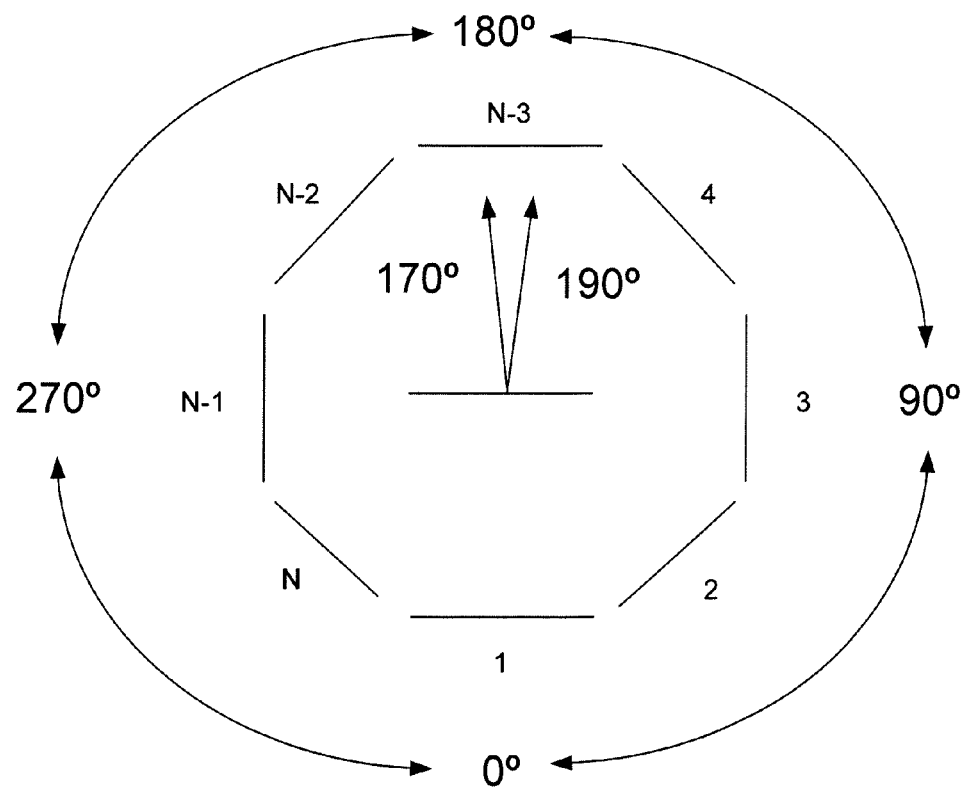
FIG. 4 is a virtual top view of the images displayed by the graphic user interface code.

The rate at which images 110 through 143 are cycled through the thumbnail display area 105 may be controlled a number of ways. In FIG. 4, the position of each image in the thumbnail display area 105 may be defined by its angle with respect to the direct viewing angle (e.g., about 0°). The rate at which each image scrolls through the thumbnail display area 105 may be defined by the rate of change of the angle over time. If a base rate of angular change is set to $$\frac{\Delta \theta_{init}}{\Delta t},$$

then the scrolling rate of the images through the thumbnail display area 105 may be defined by $$\frac{\Delta \theta_{init}}{\Delta t} + \left\lceil a \frac{\Delta \theta_{increment}}{\Delta t} \right\rceil,$$

where α has a value corresponding to the number of times the left arrow 147 or right arrow 150 are activated.

If the user clicks on the left arrow 147, the system goes to state 605 of FIG. 6. At state 605, the value $$\frac{\Delta \theta_{init}}{\Delta t} + \left\lceil a \frac{\Delta \theta_{increment}}{\Delta t} \right\rceil$$

is determined and used for the scrolling rate of the thumbnail images 110 through 143 through the thumbnail display 105. Control may then return to the home display state 600 where the thumbnail images scroll through the thumbnail display area 105 at a higher rate to the left or the rate at which the thumbnail images scroll to the right is reduced. If the right arrow 150 is activated, the system goes to the state shown at 610. At state 610, the value $$\frac{\Delta \theta_{init}}{\Delta t} + \left\lceil a \frac{\Delta \theta_{increment}}{\Delta t} \right\rceil$$

is determined and used for the scrolling rate of the thumbnail images 110 through 143 through the thumbnail display 105. Control may then return to the home display state 600 where the thumbnail images scroll through the thumbnail display area 105 at a higher rate to the right or the rate at which the thumbnail images scroll to the left is reduced.

If the "stop" icon 153 is activated, then the scrolling of the thumbnail images 110 through 143 through the thumbnail display area 105 may stop at state 615. At state 620, the system may optionally advance to display the next image in the image set occurring immediately after the stop icon 153 is activated. Entry into state 620 may be dependent on the scrolling rate of the thumbnail images through the thumbnail display area 105. State 620 may be entered when the scrolling rate exceeds a predetermined threshold. After the motion is stopped at state 615, the system may enter the home state of 600.

If the double right arrow 157 is activated, the system may go to state 625 where the thumbnail images 110 through 143 may scroll to the right and stop on the next image of the image set. If the double left arrow 155 is activated, the system may go to state 630 where the images 110 through 143 may scroll to the left and stop on the next image of the image set.

FIG. 7 is a further state diagram of a process that may be used by the graphic user interface 100. From the home display state 600, activation of the "−" magnifying icon 173 may cause the system to go to state 705 where the image displayed in the main viewing area 145 may be reduced in size. Control may then return to the home display state 600. Activation of the "+" magnifying icon 175 may cause the system to go to state 710 where the image displayed in the main viewing area 145 may be magnified. The system may then go from state 710 to the home display state 600.

Generation of a gesture to the left may cause the system to enter the state shown at 715 where the thumbnail images 110 through 143 scroll to the left through thumbnail image display area 105. Control may then return to the home display state 600. Generation of a gesture to the rights may cause the system to enter the state shown at 720 where the images 110 through 143 to scroll to the right through thumbnail image display area 105 before returning to the home display state 600. The rate at which the thumbnail images 110 through 143 scrolls through the thumbnail image display area 105 may be dependent on the magnitude of the detected gesture.

Image creep may be reduced by moving all of the images at the same time. There are various ways of changing the rate of the images passing through the image display area 105 to avoid creeping. The extent to which the rotation angle changes with each refresh (see FIG. 4) may be varied. Alternatively, the angle may be maintained while the delay between each re-fresh is changed. However, in some systems, these methods may cause the images to move through the image display area 105 in a choppy manner. Using a refresh rate of about 30 frames per second and varying the extent to which the angle changes with each refresh may be used to avoid jitter.

The endless shape may have crossover points where the displayed images and the undisplayed images of the image set are adjacent one another for transition between the displayed and undisplayed regions of the endless shape. Such a crossover point is shown at 215 of FIG. 2. Inconsistencies associated with transitioning images at the crossover point may be compensated by transitioning images having a vertical centerline between about 170° and 190° with respect to a center of rotation through a displayed image region or an undisplayed image region of the endless shape. In FIG. 2 and FIG. 4, when the vertical center line of an image transitions across an angle of about 180°±10° and the displayed region 200, it is switched with the image of the undisplayed region 205 that is to replace it. Although other values may be used, the safety value of ±10° is large enough to avoid software problems while being small enough to avoid having the display look incorrect or flawed.

While particular implementations have been described, changes and modifications may be made. For example:

1. Images may be rotated into and out of the thumbnail display area 105 vertically, rather than horizontally;
2. Multiple figure-eights may be implemented in different planes, so that planes may slide up and down, into and out of the thumbnail display area 105;
3. Non-visible images may be stored in other layouts resulting in different sequencing or scrolling effects; and/or
4. The images may be arranged in a stylized hour-glass pattern or other pattern.

The method may be embodied in sets of executable machine code stored in a variety of formats such as object code or source code. Such code may be programming code or a computer program. The executable machine code may be integrated with the code of other programs, implemented as subroutines, by external program calls, in firmware or by other techniques.

The implementations executed by a computer processor or similar device programmed in the manner above may be executed by an electronic system that is provided with means for executing these steps. Similarly, an electronic memory medium such computer diskettes, CD-Roms, Random Access Memory (RAM), Read Only Memory (ROM) or similar computer software storage media, may include program code to execute such methods. The systems may be part of one or more computers, smart terminals, personal digital assistants, Internet-ready telephones, television set-top boxes (STBs), telematics, and other devices.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A system comprising:
   a processor;
   a display controlled by the processor;
   software code executable by the processor to link a plurality of images of an image set into an endless loop in virtual space, where the images of the image set are scrolled along the endless loop for display, where the endless loop includes a first lobe and a second lobe, the first lobe and second lobe meeting at a crossover region;
   where images of the image set that are not currently visible on the display are linked to the first lobe and images of the image set that are currently visible on the display are linked to the second lobe;
   where the crossover region defines where images of the image set transition between the first lobe and second lobe; and
   where an image linked to the second lobe transitions to the first lobe when the image reaches an angle of $180°\pm\theta_{safety}$ with respect to a normal viewing angle of the display, where $\theta_{safety}$ corresponds to a safety tolerance angle.

2. The system of claim 1, where images appearing in a foreground of the display are displayed as solid objects that overlap images appearing in a background of the display.

3. The system of claim 1, where the endless loop comprises a figure-eight shape.

4. The system of claim 1, where images linked to the second lobe are scaled vertically as they rotate from a position opposite the crossover point to the crossover point.

5. The system of claim 1, where images linked to the second lobe are scaled horizontally as they rotate from a position opposite the crossover point to the crossover point.

6. The system of claim 1, where $\theta_{safety}$ is about 10°.

7. The system of claim 1, further comprising a plurality of human interface controls.

8. The system of claim 7, where the software code is executable to be responsive to actuation of one or more of the human interface controls to control the rate at which the images of the image set are scrolled along the endless loop.

9. The system of claim 7, where the software code is executable to be responsive to actuation of one or more of the human interface controls to control the direction in which the images of the image set are scrolled along the endless loop.

10. The system of claim 1, where the images are thumbnail images and where the software code is executable to be responsive to actuation of a displayed thumbnail image to provide a corresponding full-sized image on the display.

11. The system of claim 1, where the images are thumbnail images that correspond to software applications and where the software code is executable to be responsive to actuation of a displayed thumbnail image to launch the corresponding software application.

12. The system of claim 1, where the images are thumbnail images that correspond to audio and/or video media and where the software code is executable to be responsive to actuation of a displayed thumbnail image to playback the corresponding audio and/or video media.

13. A method for providing a graphic user interface comprising:
   generating an endless loop in virtual space;
   linking a plurality of the images of an image set into the endless loop;
   scrolling the images of the image set along the endless loop for provision to a display;
   where the endless loop includes a first lobe and a second lobe, the first lobe and second lobe meeting at a crossover region;
   linking images of the image set that are not currently visible on the display to the first lobe;
   linking images of the image set that are currently visible on the display to the second lobe; and
   transitioning an image linked to the second lobe to the first lobe when the image reaches an angle of $180°\pm\theta_{safety}$ with respect to a normal viewing angle of the display, where $\theta_{safety}$ corresponds to a safety tolerance angle.

14. The method of claim 13, further comprising displaying images appearing in a foreground of the display as solid objects that overlap images appearing in a background of the display.

15. The method of claim 13, where the endless loop is generated as a figure-eight shape.

16. The method of claim 13, where the crossover region defines where images of the image set transition between the first lobe and second lobe.

17. The method of claim 13, further comprising vertically scaling images linked to the second lobe as they rotate from a position opposite the crossover point to the crossover point.

18. The method of claim 13, further comprising horizontally scaling images linked to the second lobe as they rotate from a position opposite the crossover point to the crossover point.

19. The method of claim 13, further providing a plurality of human interface controls.

20. The method of claim 19, further comprising responding to actuation of one or more of the human interface controls to control the rate at which the images of the image set are scrolled along the endless loop.

21. The method of claim 19, further comprising responding to actuation of one or more of the human interface controls to control the direction in which the images of the image set are scrolled along the endless loop.

22. The method of claim 13, further comprising displaying a full-sized image on the display in response to selection of a displayed image.

23. The method of claim 13, where the images are thumbnail images and further comprising launching a software application corresponding to a thumbnail image when the thumbnail image is actuated.

24. The method of claim 13, where the images are thumbnail images that correspond to audio and/or video media and further comprising playing back audio and/or video media corresponding to a thumbnail image when the thumbnail image is actuated.

25. The method of claim 13, where $\theta_{safety}$ is about 10°.

26. A system for providing a graphic user interface comprising:
   means for generating an endless loop in virtual space;
   means for linking a plurality of the images of an image set into the endless loop;
   means for scrolling the images of the image set along the endless loop for provision to a display;
   where the endless loop includes a first lobe and a second lobe, the first lobe and second lobe meeting at a crossover region;
   means for linking images of the image set that are not currently visible on the display to the first lobe;
   means for linking images of the image set that are currently visible on the display to the second lobe; and
   means for transitioning an image linked to the second lobe to the first lobe when the image reaches an angle of 180°±$\theta_{safety}$ with respect to a normal viewing angle of the display, where $\theta_{safety}$ corresponds to a safety tolerance angle.

27. The system of claim 26, further comprising means for displaying images appearing in a foreground of the display as solid objects that overlap images appearing in a background of the display.

28. The system of claim 26, where the endless loop is generated as a figure-eight shape.

29. The system of claim 26, where the crossover region defines where images of the image set transition between the first lobe and second lobe.

30. The system of claim 26, further comprising means for vertically scaling images linked to the second lobe as they rotate from a position opposite the crossover point to the crossover point.

31. The system of claim 26, further comprising means for horizontally scaling images linked to the second lobe as they rotate from a position opposite the crossover point to the crossover point.

32. The system of claim 26, where $\theta_{safety}$ is about 10°.

* * * * *